Figure 1:
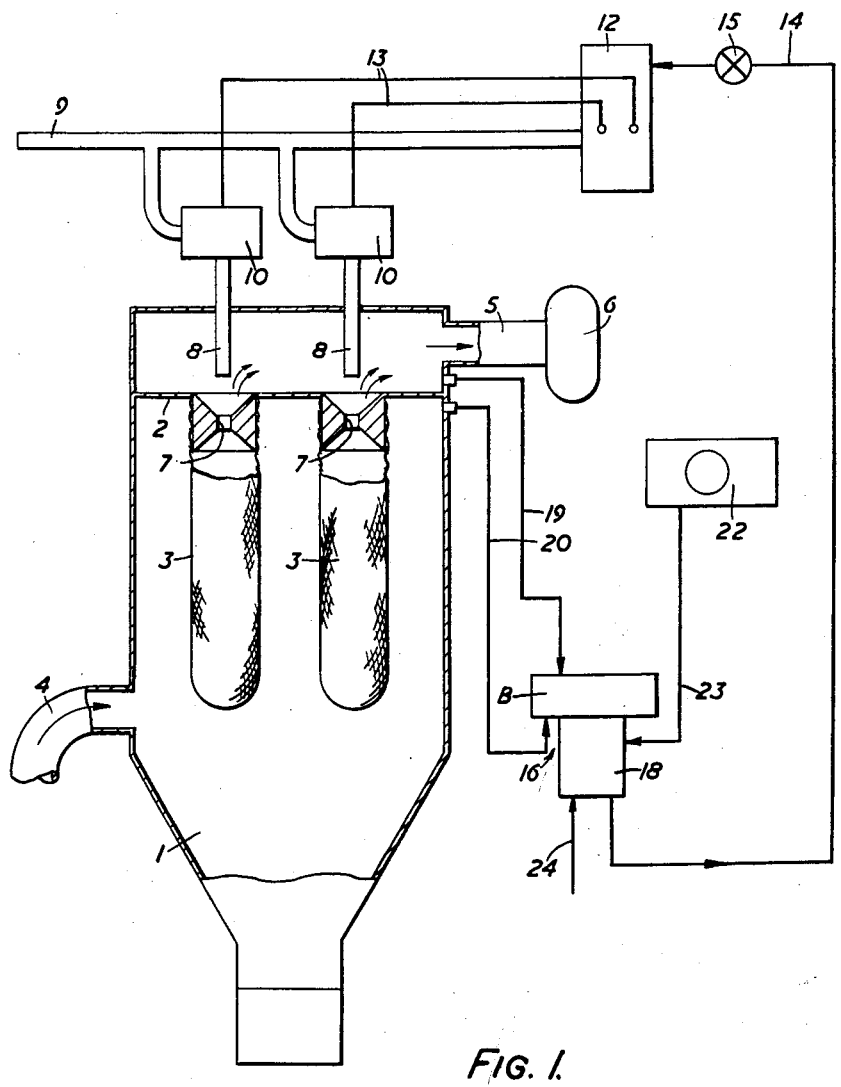

INVENTORS
ROBERT W. YOUNG
HENRY A. HALLETT.
BY Irwin S. Thompson
ATTORNEY

3,073,097
GAS FILTRATION PLANT
Henry Albert Hallett and Robert William Young, Cheltenham, England, assignors to Cheltenham Auto Controls Limited, Cheltenham, England
Filed Mar. 31, 1960, Ser. No. 18,938
Claims priority, application Great Britain Apr. 1, 1959
18 Claims. (Cl. 55—283)

This invention relates to gas filtration plant of the type comprising a housing containing one or more filtration chambers or bags, and is particularly concerned with means and methods for cleaning such chambers or bags.

With filtration plant of the above type the gas passes through the wall of each chamber or bag so that the dust is left clinging to the outer surface of the latter, and the chambers or bags are commonly cleaned in succession by "back washing" or reverse flow cleaning. A back washing or reverse gas flow step is introduced for the purpose of setting up a shock wave inside the chamber or bag so that the flow of gas is momentarily reversed or stopped as a result of which the filter cake which has built up on the outer surface of the chamber or bag detaches itself and falls into a hopper at the bottom of the housing.

Normally the housing contains a number of filter chambers or bags arranged in parallel, and it is an operational requirement that the reverse gas blast should be applied to the chambers or bags in sequence so that the plant is never taken out of operation. For this reason it is important to have means for accurately timing the duration of the reverse gas blast and the interval between blasts. Previously, such means have normally been operated on a free-running cycle so that a blast is applied to a particular chamber or bag at regular timed intervals. In many operations, for example grinding operations, the contamination of the gas being filtered varies considerably, and it has been necessary to clean the chambers or bags sufficiently frequently to keep them clear under conditions of high contamination of the gas with the result that such cleaning is unnecessarily frequent at other times.

One object of the invention is to provide gas filtration plant comprising a housing containing a filter chamber or bag, means for producing a reverse gas blast to clean said chamber or bag and control means which in use act to compare the pressure drop across the chamber or bag with a reference pressure and actuate the blast producing means in dependence upon the difference between the pressure drop and the reference pressure.

Thus, with a plant in accordance with the invention, the frequency of cleaning of the chamber or bag depends upon the amount of filtered material clinging to the surface thereof, and blasting will be more frequent during periods of high contamination of the gas than during periods of lower contamination. In addition, the control means can be set by adjustment of the reference pressure so that the pressure drop across the chamber or bag against which the fan or blower producing the gas flow has to work does not reach a level at which the fan or blower is overloaded and working under conditions of low efficiency.

The reverse blast may utilise the gas being filtered, but it is more conveniently an air blast supplied from a separate pneumatic pressure source. By adjustment of the reference pressure, which is conveniently also a pneumatic pressure, the pressure drop at which the blast producing means operate can be adjusted. This is a great advantage, as the minimum pressure drop across the chamber or bag depends upon the material being filtered. For example, a material such as cement will allow the plant to be operated with a considerably lower pressure drop than a material such as sugar or coffee. The reference pressure can thus be adjusted to suit both the material being filtered and plant operating conditions.

Preferably the control means sense the pressure drop between inlet and outlet zones of the housing. A differential unit associated with a controller, or a differential pressure transmitter feeding the later, may be connected directly to said inlet and outlet zones, the controller being arranged to bring the blast producing means into operation when the differential pressure across the housing rises to an operating value bearing a fixed relationship to the reference pressure.

An adjustable pressure reducing valve may be provided, its outlet being connected to the controller and providing the reference pressure.

The controller may act to produce a pneumatic signal which directly controls the blast means, and the latter means are also conveniently pneumatic in operation and may be of the general character disclosed in the copending patent application Serial No. 805,622.

Preferably the controller output signal not only acts to bring the blast means into operation when the pressure drop rises to the aforesaid operating value, but also controls the frequency of blast production until the pressure drop falls below that value. The arrangement may be such that when the pressure drop equals or exceeds the operating value the level of the controlled output signal rises continuously, thereby progressively increasing the frequency of blast production until the pressure drop is again reduced below the operating value.

As has already been stated, the housing normally contains a plurality of chambers or bags and in such case the blast means preferably act to apply a reverse gas blast to the chambers or bags in sequence, as usual. With such an arrangement a number of the bags, and on occasions all of them, may have to be cleaned in turn until the chocked bag producing the excessive pressure drop is cleaned. To obviate this, each bag may be arranged in a separate housing and each of the housings associated with its own controller so that when a single bag becomes chocked only that bag is cleaned by a reverse blast.

According to a further object of the invention pneumatic control means for reverse blast producing means of a gas filtration plant comprise a differential unit adapted to sense the pressure difference across a chamber or bag of the plant and an associated controller comprising means for comparing said pressure difference with the reference pressure and arranged in use to produce a pneumatic output signal when said pressure difference rises to an operating value dependent upon the reference pressure.

Preferably unit construction is adopted for the differential unit and controller and the latter preferably has a relay valve or "booster" providing the final output signal. This relay valve may be controlled in dependence upon the pressure upstream of a nozzle which forms part of said means for comparing the pressure difference and reference pressure and exhausts to atmosphere, this nozzle being throttled in dependence upon said pressure difference and said reference pressure.

A single throttling member for the nozzle may be urged in opposite directions by the pressure difference and the reference pressure, the balance position of this member providing the corresponding nozzle pressure. The differential unit may incorporate a bellows, across which the pressure difference is applied and to which the throttling member is attached, this member also being attached to a diaphragm on which the reference pressure acts.

Preferably the arrangement is such that after the pressure difference has reached the operating value at which an output signal is produced the latter continually rises until operation of the blast producing means has resulted in reduction of the pressure difference below that value.

To this end the controller preferably embodies proportional and integral control sections, although in many cases the integral control section can be omitted if a sufficiently narrow proportional control band is used for the proportional control section.

Additional control of the blast means may be employed dependent upon the operating conditions of a fan or blower producing the gas flow, for example in dependence upon the load current of an electric motor driving the fan or blower. By these means it is possible to control cleaning of the plant so that the fan or blower always works under conditions of high efficiency, and the arrangement may be such that the reference pressure with which said differential pressure is compared is dependent upon the motor load current.

Figure 2:
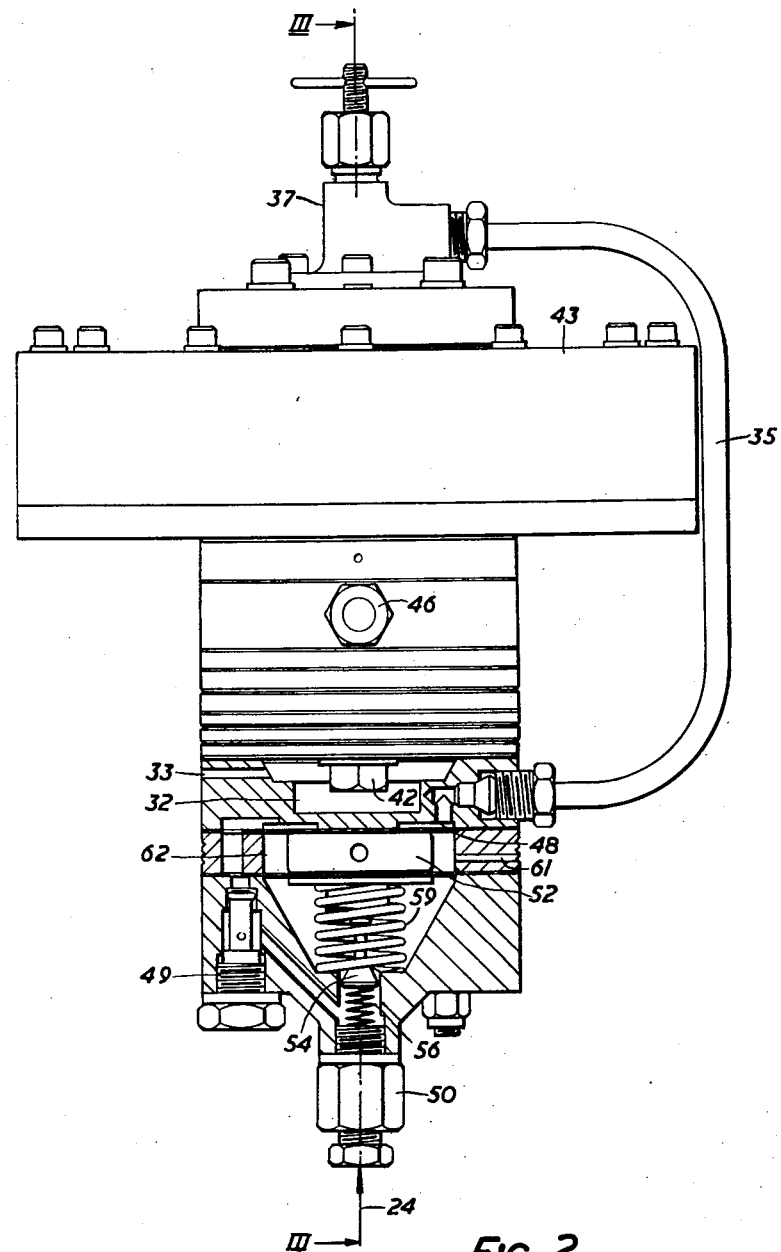
Figure 3:
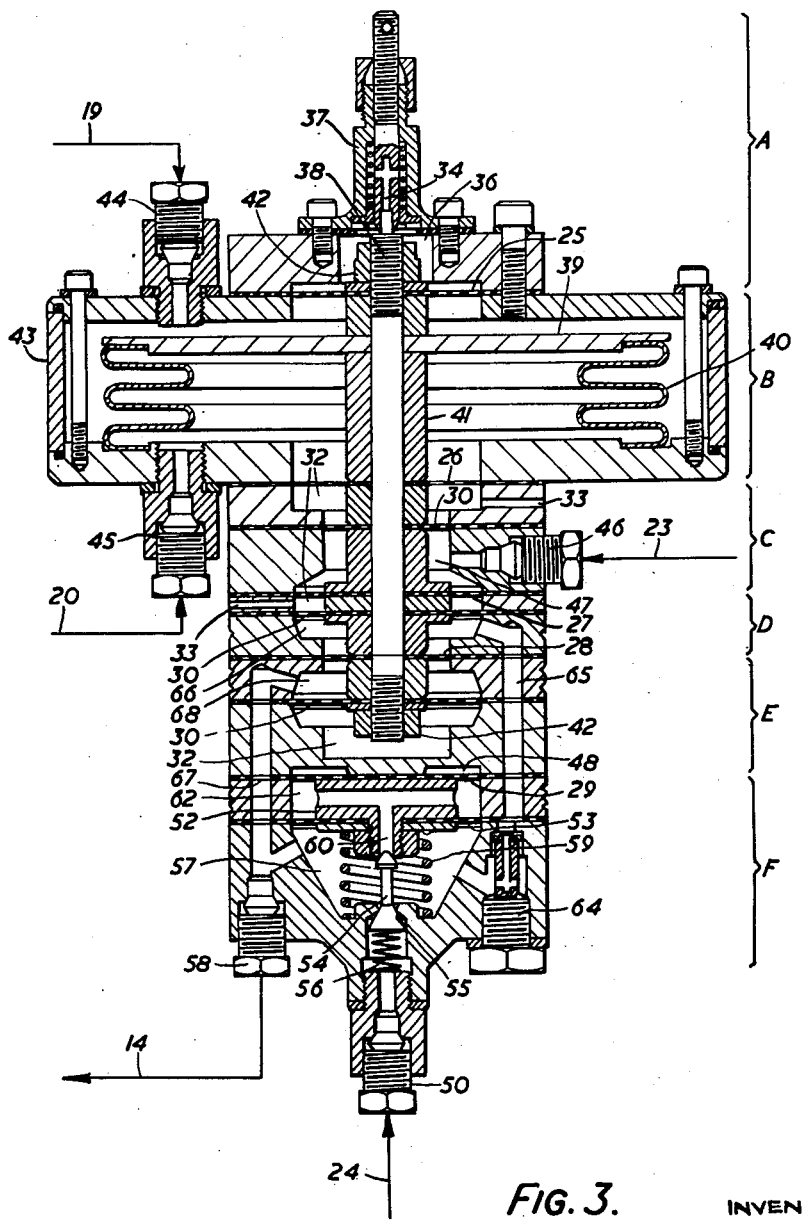

The invention will now be further described with reference to the accompanying drawings which illustrate, by way of example, a gas filtration plant and control means in accordance with the invention, and in which:

FIGURE 1 is a diagrammatic flow diagram of the plant and associated control gear, FIGURE 2 is a part-sectioned side view of the control means, and FIGURE 3 is a sectional view of the control means on the line III—III in FIGURE 2.

The filtration plant comprises a housing 1 divided by a horizontal division 2, from apertures in which are suspended filter bags 3. Thus the division 2 divides the housing 1 into inlet and outlet zones. In use gas to be filtered is drawn through an inlet pipe 4 into the inlet zone, through the bags 3 and the division 2 into the outlet zone and out through an outlet pipe 5 by a suction fan 6. Each bag 3 has a throat 7 above which is fitted a blast nozzle 8, and the bags are cleaned in turn by reverse gas blasts produced by the nozzles 8. An air supply line 9 supplies main blast valves 10 which are individually associated with the nozzles 8 and controlled by the control gear which will now be described.

This control gear comprises blast producing means 12 similar to the means described in the co-pending patent application Serial No. 805,622 and connected to the valves 10 by pipes 13 along which pilot blasts are fed to actuate the main blast valves 10 which are in the form of relays. As described in the aforesaid application Serial No. 805,622 the means 12 have a timing chamber to which a pneumatic pressure is applied to bring them into action to apply pilot blasts in turn along the conduits 13, and this chamber is supplied through a conduit 14 which contains an adjustable throttling valve 15. The value of the pressure in the timing chamber governs the frequency of the pilot blasts. Signals to actuate the blast producing means 12 are provided by control means 16 to the output of which the conduit 14 is connected.

The control means 16 comprise a differential unit section B and a controller 18. The section B is connected by conduits 19 and 20 respectively to the low and high pressure sides of the division 2 i.e. the inlet and outlet zones of the housing 1, and acts to sense the pressure difference across the bags 3. A reference pressure is supplied from a preselector unit 22 through a conduit 23 to the controller 18 and, in a manner described in detail hereinafter, the controller 18 supplies an output signal to the blast producing means 12 when the pressure difference sensed by the pressure section B rises to an operating value dependent upon the reference pressure. A pneumatic supply to operate the controller and provide the output signal of the latter is fed to the controller through a conduit 24.

In its simplest form the preselector unit 22 consists of an adjustable pressure reducing valve which can be preset to provide an operating pressure to suit the material being filtered and plant operation generally. An alternative construction of the unit 22 includes means responsive to the load current of an electric motor driving the fan 6 so that the operating pressure is controlled, by variation of the reference pressure, in dependence upon the operating conditions of the motor.

The throttling valve 15 controls the time delay which occurs between the production of an output signal sufficient to actuate the means 12 by the controller 18 and operation of the means 12, and the setting of the valve 15 is chosen to suit the plant operating conditions and also to introduce stability of operation.

With reference particularly to FIGURES 2 and 3 which illustrate the control means 16 in greater detail, these means are of unit construction and can be considered as comprising a plurality of interconnected sandwiched sections. From one end these sections are arranged in the following order: a nozzle section A, the differential unit section B, a reference section C, an integral control section D, a proportional control section E and a relay valve or booster section F. Sections A, C, D, E and F together form the controller 18 shown diagrammatically in FIGURE 1, and the control means can be mounted in any desired position but for the purposes of description and illustration they are considered with the nozzle section A uppermost.

The various sections are separated by diaphragms 25, 26, 27, 28 and 29, and the sections C, D and E are subdivided by diaphragms 30 to provide chambers 32 which are vented to atmosphere through vent bores 33 but otherwise completely closed. These chambers are provided to permit free movement of the parts in the manner described hereinafter and prevent any possibility of pressure lock conditions impeding such movement.

The nozzle section A comprises a downwardly facing nozzle 34 which is supplied with pressure air through an external pipe 35 and exhausts into a vented exhaust chamber 36 above the diaphragm 25. A threaded stem of the nozzle 34 enables its vertical position to be adjusted within a nozzle housing 37 into which the pressure air is supplied by the pipe 35.

A throttling member or spindle 38 arranged below the nozzle 34 for variable throttling of the latter passes centrally through and is connected to an end wall 39 of a differential bellows 40 of the section B. The spindle 38 also passes through the diaphragms 25, 26, 27, 28 and 30, being sealed and connected thereto by an assembly of spacing sleeves such as 41 on the spindle 38. Nuts 42 threaded on the ends of the spindle 38 clamp the whole assembly rigidly together. The bellows 40 is arranged in a sealed differential housing 43 between the diaphragms 25 and 26, and the lower end of the bellows is sealed relatively to the lower end of this housing.

Inlet unions 44 and 45 are provided respectively communicating with the space in the housing 43 surrounding the bellows 40 and the internal volume of the latter and, as shown, they are in use connected to the conduits 19 and 20 of the plant. Thus a pressure differential equal to the pressure difference across the filter bags 3 is produced across the end wall 39 of the bellows 40 and tends to move the spindle 38 upwardly to increase the throttling of the nozzle 34. This upward movement of the spindle 38 is opposed by the reference pressure applied through a reference connection 46 which communicates with a reference chamber 47. As a result of the differential area of the diaphragms 30 and 27 which form the upper and lower limits of this chamber the reference pressure produces a thrust on the spindle 38 tending to move the latter downwardly away from the nozzle 34. Thus the throttling of the nozzle 34 resulting from a given pressure difference across the filter bags 3 will depend upon the reference pressure as adjusted by the preselector unit 22 of the plant.

The nozzle housing 37 is supplied through the pipe 35 from a valve operating chamber 48 which is in turn supplied through a restrictor 49 from an inlet connection 50 connected to the supply conduit 24. As a result of the provision of the restrictor 49, increased throttling of the nozzle 34 as the pressure difference across the filter bags 3 rises produces a rise in pressure upstream of the nozzle 34 and hence in the chamber 48. This pressure acts downwardly on a valve seat 52 fixed to the diaphragm 29 and a lower diaphragm 53 and urges it into engagement with a valve member 54 of the booster valve, this member being normally held closed against its seating 55 by a valve spring 56. The booster valve 54, 55 is positioned between the inlet connection 50 and a booster chamber 57 which is connected to an outlet connection 58 for connection to the conduit 14.

A valve spring 59 urges the valve seat 52 upwardly to its normal resting position shown in the drawings in which it is clear of the valve member 54 and a through port 60 is open and exhausts the booster chamber 57 into an exhaust chamber 62 between the diaphragms 29 and 53 which is permanently vented to atmosphere at 61. This produces a sharp cut-off for the output signals produced in the booster chamber 57.

As the pressure difference across the filter bags 3 rises the throttling of the nozzle 34 increases and the pressure in the chamber 48 rises until it is sufficient to overcome the spring 59 and moves the valve seat 52 into engagement with the valve member 54. This seals the exhaust port 60 and further rise in pressure in the chamber 48 displaces the valve member 54 to open the booster valve which admits pressure air to the booster chamber 57 and hence produces an output signal at the output connection 58.

This output signal is applied from the booster chamber 57 through an integral control restrictor 64 and internal passage 65 to an integral control chamber 66 of the section D. As a result of the differential area of the diaphragms 28 and 30 defining the limits of the chamber 66 an additional upward force is produced on the spindle 38 to increase the throttling effect of the latter and a further increase in pressure in the chamber 48 actuating the booster valve. Due to the restrictor 64 this integral control force gradually increases as long as the booster valve is open, and an integral control action results.

The output signal is also supplied through an internal passage 67 to a proportional control chamber 68 and the differential area of the diaphragms 28 defining this chamber 68 results in a downward force on the spindle 38 and thus results in a proportional control action.

The output signal applied to the conduit 14 acts, in the manner already described, to initiate cleaning of the filter bags 3 until the pressure difference across the latter drops to a value at which the throttling of the nozzle 34 by the spindle 38 does not produce a pressure in the chamber 48 sufficient to hold the booster valve open. Whilst the booster valve is open the output signal increases, and this results in a gradually increasing frequency of operation of the blast producing means 12 until the filter bags 3 are cleaned. As the valve seat 52 reaches its normal resting position after the booster valve has closed the port 60 is opened to exhaust the booster chamber 57 and cut off the output signal. No further output signal is produced until the pressure difference across the filter bags 3 again results in throttling of the nozzle 34 sufficient to produce a pressure in the chamber 48 of the necessary magnitude to open the booster valve.

We claim:

1. A gas filtration plant comprising a housing containing a filter element, such as a filter bag, means for producing a reverse gas blast to clean said element, and pneumatic control means comprising a member, a nozzle exhausting to atmosphere and variably throttled by said member, a restrictor through which said nozzle is supplied, means for applying a differential force in one direction to said member dependent upon the pressure drop across said element, and means for applying a reference pressure dependent upon an externally produced pneumatic reference pressure to said control member in direct opposition to said differential force, the pressure of said restrictor providing a pneumatic control signal according to the resultant force applied to said member, said control signal being fed to said means for producing a reverse gas blast to actuate such means in dependence upon the difference between said pressure drop and said reference pressure.

2. A gas filtration plant according to claim 1, wherein said control means further comprise a valve controlled in dependence upon the pressure downstream of said restrictor, and said member is urged towards said nozzle by said reference pressure.

3. A gas filtration plant according to claim 2, wherein said control signal is provided by the pressure at the downstream side of said valve.

4. A gas filtration plant comprising a housing containing a filter element, such as a filter bag, means for producing a reverse gas blast to clean said element, and pneumatic control means comprising a member, means for applying a differential force in one direction to said member dependent upon a pressure drop across said element, means for applying a reference pressure dependent upon an externally produced and controlled reference pressure to said control member in direct opposition to said differential force, and a nozzle variably throttled by said member to produce a pneumatic output signal upstream of said nozzle according to the resultant force applied to said member, said control signal being utilised to actuate said means for producing a reverse gas blast when the pressure drop rises to an operating value bearing a fixed relationship to said externally controlled reference pressure.

5. Pneumatic control means for reverse blast producing means of a gas filtration plant, comprising a differential section embodying a flexible bellows across which in use the pressure difference across a filter element of the plant is applied, an associated pneumatic controller section embodying a flexible diaphragm to which an externally produced preset reference pressure is in use applied, a member common to said sections being connected to said bellows and diaphragm so that the pressure difference and the reference pressure produce forces acting in direct opposition on said element, and a nozzle exhausting to atmosphere and variably throttled in dependence upon movement of said member, the arrangement being such that the controller section produces an output pneumatic signal upstream of said nozzle dependent upon the position of said member under the influence of said forces, which signal is used to control said blast producing means and is zero until the pressure difference rises to an operating value bearing a fixed relationship to the reference pressure.

6. Control means according to claim 5 wherein a diaphragm attached to said member and to which the output signal is directly applied provides proportional control for the latter.

7. Control means according to claim 6, wherein a further diaphragm attached to said member and to which the output signal is applied through a restrictor provides integral control of the output signal.

8. A gas filtration plant according to claim 1, wherein said reverse gas blast and said reference pressure are provided by separate sources of pneumatic pressure.

9. A gas filtration plant according to claim 1, wherein the control means are arranged to sense the pressure drop between inlet and outlet zones of the housing.

10. A gas filtration plant according to claim 4, wherein an adjustable pressure reducing valve is arranged to provide said reference pressure which is preset by adjustment of the reducing valve.

11. A gas filtration plant according to claim 4, wherein the pneumatic output signal not only acts to bring the blast producing means into operation when the pressure drop rises to said operating value but also controls the frequency of blast production until the pressure drop falls below that value.

12. A gas filtration plant according to claim 11, wherein the arrangement is such that when the pressure drop equals or exceeds said operating value the level of the output signal rises continuously, thereby progressively increasing the frequency of blast production until the pressure drop is again reduced below the operating value.

13. Pneumatic control means for reverse blast producing means of a gas filtration plant, comprising a differential unit adapted to sense the pressure difference across a chamber or bag of the plant and an associated pneumatic controller comprising means for comparing said pressure difference with a preset externally produced reference pressure and arranged in use to produce a pneumatic output signal when said pressure difference rises to an operating value dependent upon the reference pressure.

14. Control means according to claim 5, wherein said control means comprise a nozzle arranged to be supplied through a restrictor and to exhaust to atmosphere and which in use is throttled by said member.

15. Control means according to claim 14, wherein the arrangement is such that the pressure upstream of the nozzle directly operates a relay valve providing said output signal.

16. Control means according to claim 13, wherein the controller embodies proportional and integral control sections.

17. Control means according to claim 16, wherein the proportional control section comprises a diaphragm chamber to which the output signal is directly applied.

18. Control means according to claim 17, wherein the integral control section comprises a further diaphragm chamber to which the output signal is applied through a restrictor.

References Cited in the file of this patent

UNITED STATES PATENTS

| | | |
|---|---|---|
| 1,879,107 | Couch | Sept. 27, 1932 |
| 2,650,607 | Bryant | Sept. 1, 1953 |
| 2,741,261 | Weissenborn | Apr. 10, 1956 |
| 2,909,239 | Bennett | Oct. 20, 1959 |

FOREIGN PATENTS

| | | |
|---|---|---|
| 812,244 | Great Britain | Apr. 22, 1959 |